June 11, 1957 P. V. BUTSCH ET AL 2,795,290
GAS FILTER
Filed Nov. 1, 1954 3 Sheets-Sheet 1

INVENTORS
PAUL V. BUTSCH
JOHN A. GREENLEE
BY
Robert J. Patterson
ATTORNEY

June 11, 1957  P. V. BUTSCH ET AL  2,795,290
GAS FILTER
Filed Nov. 1, 1954  3 Sheets-Sheet 3
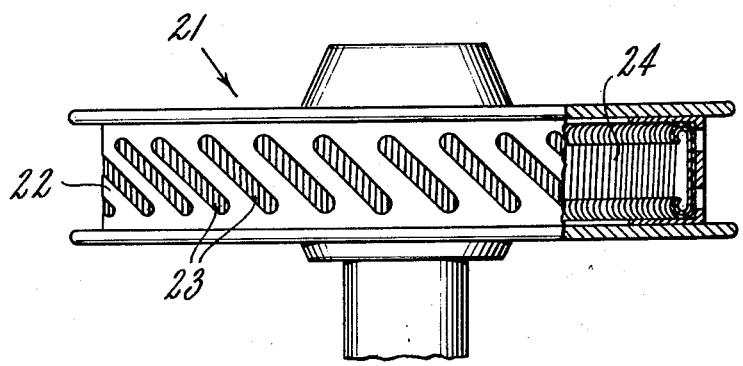
INVENTORS
PAUL V. BUTSCH
JOHN G. GREENLEE
BY
Maurice B. Stiefel
ATTORNEY

United States Patent Office 2,795,290
Patented June 11, 1957

2,795,290

GAS FILTER

Paul V. Butsch, South Bend, and John A. Greenlee, Mishawaka, Ind., assignors to United States Rubber Company, New York, N. Y., a corporation of New Jersey Application November 1, 1954, Serial No. 465,989

3 Claims. (Cl. 183—45)

This invention relates to gas filters and more particularly to improved gas filters wherein the filtering medium is composed of elements of polyethylene. Our invention also relates to a method of making a new form of fibrous polyethylene.

Recently gas filters, such as air filters used in conjunction with heating, ventilating and air-conditioning equipment, made with polyethylene filtering elements have become very popular. U. S. Patent No. 2,612,966 to W. H. Nicol, issued October 7, 1952, describes such filters. These filters are extremely successful because the action of the gas flowing through the polyethylene filtering elements causes them to become electrostatically charged with the result that the elements strongly attract suspended dust particles to them. These filters can easily be washed to remove accumulated dirt by merely directing a stream of water through them. These filters are so successful that they are rendering obsolete conventional filters made by coating fibers, such as glass fibers, with an oily or oil-like material.

The principal object of the present invention is to provide an improved polyethylene gas filter. Another object is to provide a gas filter made with polyethylene fibers having a unique structural configuration as a result of having been made in a novel manner. Another object is to provide a polyethylene gas filter which is considerably more effective than the best polyethylene gas filters heretofore available commercially. Another object is to provide a simple and commercially feasible method of making these improved polyethylene gas filters. Another object is to provide such a method which involves very low labor costs, which requires only a very small investment for equipment, which is simple to carry out, and which entails no waste of polyethylene. Another object is to provide a novel method of making a new form of fibrous polyethylene. Numerous other objects will more fully hereinafter appear.

In the accompanying drawings,

Fig. 5 is a schematic diagram showing the essential features of the flossing machine used to make the product of our invention.

We have made the surprising discovery that a polyethylene gas filter having considerably better dust and dirt removing efficiency than the best polyethylene filters now available commercially can be made by flossing polyethylene in a unique manner, namely by ejecting molten polyethylene through rotating orifices and causing the ejected molten filaments to coalesce with one another at occasional points and to solidify to form a mass of tangled, randomly disposed filaments which are irregularly kinked, which vary widely in diameter throughout the mass, and which by reason of the fusion of contiguous filaments at randomly distributed points, form an integrated mass, collecting the resulting mass, and filling a foraminous container of any suitable type commonly used in gas or air filters therewith.

Figure 1:
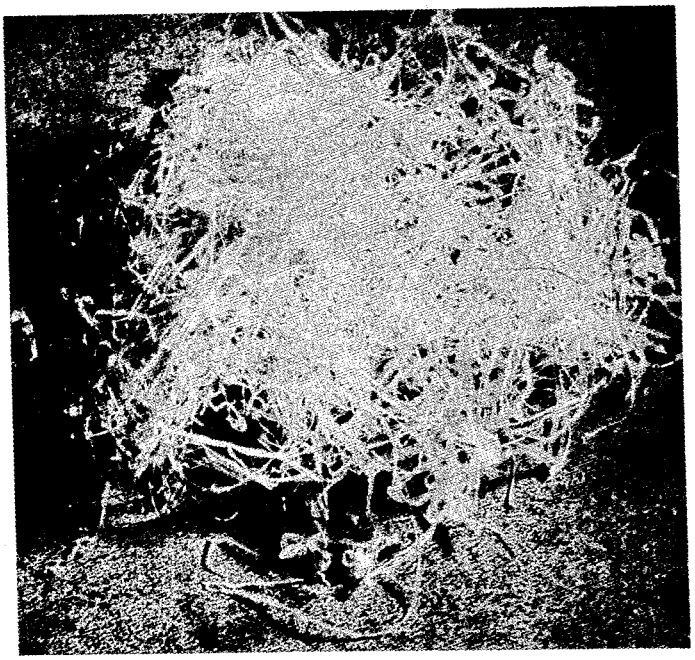
Fig. 1 is a photograph of a mass of the unique polyethylene fibrous material used in our invention.
Figure 2:
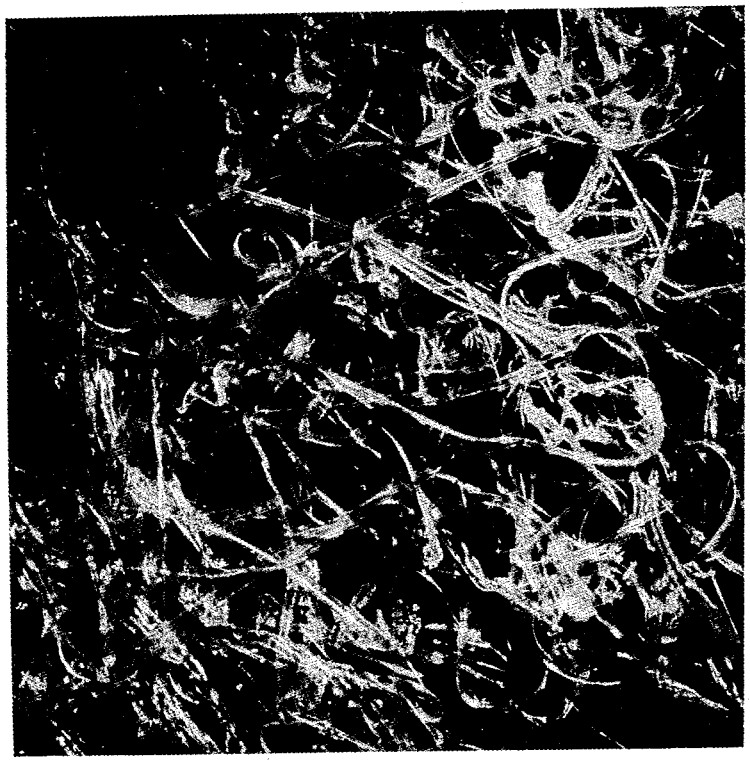
Fig. 2 is a photograph, on a larger scale than Fig. 1, of a comparatively thin layer of the polyethylene fibrous mass, showing the unusual arrangement and configuration of the fibers composing it.
Figure 3:
Fig. 3 is a photograph like Fig. 2 but made with an enlargement corresponding to approximately twice the scale of Fig. 2; and, Fig. 4 is a photograph of a typical air filter (which actually was 16" x 20" x 1" in size) made according to our invention.

More specifically, in practicing our invention we use polyethylene which has been flossed in a manner generally similar to that by which so-called "candy floss" or "cotton candy" is made with the exception that due to its peculiar melting, flowing, and solidifying characteristics, polyethylene forms a unique fibrous mass, which is very different in structure and appearance from candy floss, when particulate polyethylene is substituted for the granular sugar in the ordinary process of making candy floss. Whereas ordinary candy floss comprises a mass of attenuated filaments of substantially uniform cross-section throughout their length, resembling mineral wool in appearance, when polyethylene is used in place of sugar, there is formed a mass of tangled, randomly disposed polyethylene filaments which are irregularly kinked, which vary widely in diameter throughout the mass, and which are fused at occasional points to one another to form an integrated structure which has unusual gas or air filtration properties. We believe that these unusual properties are partly due to the self-supporting structure formed by the fusion of the filaments, with resulting integral welding thereof, at occasional points throughout the mass and to the fact that filaments of relatively small diameter are supported by a framework formed by fusion at occasional points of filaments of relatively large diameter. The result is a mass which has low density and which is free from objectionable compaction of the mass both initially at the time when the filter is made and during its service life. In addition, this peculiar structure imparts low back pressure to the filter so that the pressure drop of the gas passing therethrough is kept at a minimum in spite of the high proportion of relatively fine filaments in the structure. Whatever the explanation may be, the fact is that the gas filtration effectiveness of polyethylene floss made as described herein is outstanding. Each individual fiber of the polyethylene floss used in our invention is different from every other fiber and varies within itself to give elongated or tear drop effects, this being attributable to the motion of the ejected molten droplets through the air with resulting cooling and attenuation into filaments of widely varying size and cross-section. The unusual nature of the resulting mass of fibers is especially evident from Figs. 2 and 3 of the drawings.

The density of the filamentary polyethylene mass used in our invention will vary widely depending upon the exact method of flossing used and the degree with which the mass is compacted. The density of the mass as it is prepared will usually be considerably less than 10 pounds per cubic foot, and in loading it into the holding or retaining device wherein it is exposed to the gas stream to be filtered we usually charge it in amount equal to from 1.5 to 6.0 pounds of polyethylene floss per cubic foot of space presented by the holding or retaining device.

In flossing the polyethylene, we employ a candy flossing machine such as is shown in U. S. patent to Brent No. 1,489,342 issued April 8, 1924, which is hereby incorporated by reference in order to avoid repetition. They are readily available at reasonable cost, are simple and easy to operate, do not require highly skilled labor, and are trouble-free. When using such a machine to floss polyethylene, we prefer to dispense with the collecting bowl and merely set the machine on the floor or on a suitable platform, allowing the polyethylene floss to build up thereon around the machine as it is formed whereupon we collect the floss and load it into suitable foraminous containers, such as the ordinary metal frames having spaced facing layers of "hardware cloth" or wire screen, these containers being disposed transversely of the gas stream so that the gas passes through one facing layer, then through the mass of polyethylene floss and then through the other facing layer.

Fig. 5 is a schematic diagram showing the essential features of the flossing machine and is taken from Fig. 15 of Brent Patent 1,489,342. The polyethylene is introduced into a rotative vessel 21, the peripheral wall 22 of which is provided with openings or slots 23, the vessel being provided with an electric heating element 24.

Means are provided for independently controlling the speed of rotation of the rotative vessel and the degree of heat generated by the heating element. In flossing polyethylene with such a machine, the vessel is rotated, the electrical heating element is heated up, and particulate, e. g., granular, powdered cubed or lumped polyethylene is poured, intermittently or continuously, into the container and centrifugally forced against the heating element. It accumulates against the heated resistance elements and is melted under the influence thereof, the molten polyethylene being forced centrifugally outwardly through the slots of the heating element and through the slots of the surrounding annular band into the surrounding air where it quickly solidifies. The formation of the filaments appears to take place concentrically with the rotating container. As the molten filaments are formed, they are caused to cross one another and in many instances to coalesce at the points of crossing with each other before solidification occurs. As a result, a unique structural network is formed and the resulting mass of material has unusually good gas filtration properties.

Any polyethylene which is commercially available in particulate form can be used in practicing our invention. As is well-known, the molecular weight of the polyethylene may vary widely. We have obtained unusually good results using that form of polyethylene which is sold as "Alathon 10," which has an estimated average molecular weight of from 10,000 to 15,000; we have obtained equally good results with the "DYJT" grade of Bakelite polyethylene resin, having an estimated average molecular weight of about 12,000. Generally speaking, we prefer to use polyethylene having a relatively low molecular weight, i. e. not over 15,000 and even more preferably not over about 12,000 since the lower molecular weight material seems to floss more easily. In general, the higher the molecular weight of the polyethylene used, the more electrical power required to be supplied to the electrical heating element of the candy floss machine in order to effect melting and flossing at a satisfactory rate. The amount of heat input into the polyethylene can also be varied by changing the speed of rotation of the container of the candy floss machine. Those skilled in the art will understand that the rotative speed of the heating element and the electrical input thereto will be varied with the different types of polyethylene. We prefer to use a flossing machine in which the rotative speed and electrical input can be separately varied. Those skilled in the art will appreciate that considerable variation in the properties of the floss can be secured by varying these factors and by varying the type of polyethylene used, and they will, by following our teachings, experience no difficulty in making polyethylene floss suitable for use in accordance with our invention.

The following example represents a typical method of making flossed polyethylene for use in gas filters in accordance with our invention.

EXAMPLE

Bakelite "DYJT" brand of granular polyethylene was flossed in a "Super Deluxe Model D Improved Electric Candy Machine." This machine, also known as the "Super Wizard," was equipped with a double spinner head having two slotted electrical heating elements connected in parallel and disposed one above the other at its periphery just inside two slotted bands. This machine was connected to 110–125 volt A. C. and operated with the spinner rotating at 1,000 R. P. M. instead of the design speed of approximately 2,450 R. P. M. used when sugar is converted to candy floss. Electricity was supplied to the two heating elements at the rate of 1100 watts per hour, as contrasted with approximately 1550 watts per hour when flossing sugar. These reductions in speed and in power consumption of the heating elements were achieved by the use of rheostats in series with the driving motor and heating elements. The lower rotative speed was used because it caused the generation of a higher temperature in the spinner and effected better melting of the polyethylene. The specified rotative speed and power consumption seemed to be best suited to the melting characteristics of the particular polyethylene used.

Figure 4:
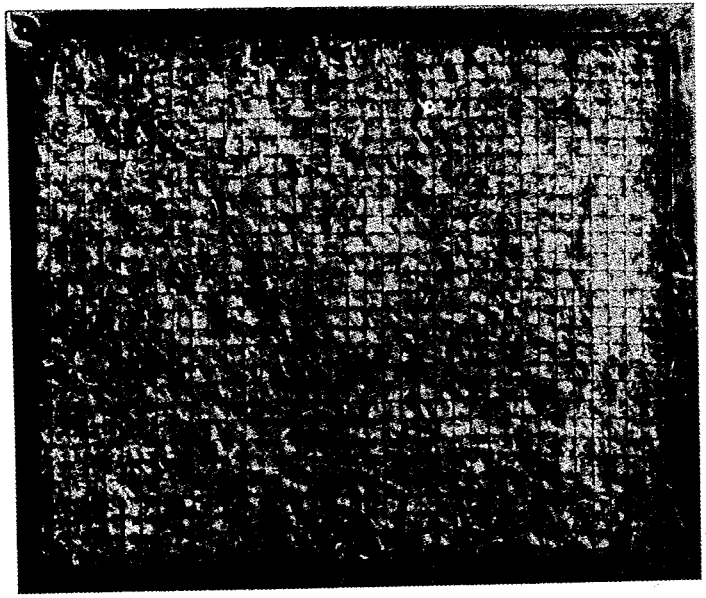

The resulting polyethylene floss was loaded into a container of the type portrayed in Fig. 4 of the drawings. This container was of conventional type, 16" x 20" in size and comprising spaced parallel flat sections of hardware cloth and a surrounding retaining frame of galvanized sheet iron turned inwardly over the edges of the hardware cloth on both faces. This container had a depth of 1 inch. Suitable means for providing access to the interior of the container, to enable charging and discharging thereof, was provided. The density of the floss was 5.0 pounds per cubic foot and it had a thermal conductivity (K) of 0.278 B. t. u./hr./square foot/degree F./inch at a mean temperature of 14.5° F. and a thermal conductivity of 0.312 at a mean temperature of 52° F.

The resulting filter was tested for gas filtering properties in the following way. Three sets of comparative filtering tests were run. In each test two filters of one kind and two filters of another kind were used. In all tests filters 16" x 20" x 1" in size were used, these being mounted transversely of the air stream which had an initial (incoming) velocity of 500 feet per minute. In each test, 3 grams of very finely powdered aluminum were introduced into the air stream before it encountered the first filter. The aluminum was introduced gradually over a period of 20 minutes at a point far enough ahead of the filters to insure uniform suspension in the air stream as it passed through the filters.

In each of the three tests, the air stream on one side passed first through a filter of one kind and then through a filter of the other kind placed directly therebehind. On the other side the air stream passed first through a filter of the second kind and then through a filter of the first kind placed directly behind it. The arrangement was such that the air that went through the first filter was forced to go through the second one. Each of the filters was weighed before and after the addition of the 3 gram portion of aluminum to determine the amount of aluminum picked up by the filters. The pick-up values given below for the filters of each kind represent the sum of the pick-up for the two like filters used in each test. The data were as follows:

FIRST TEST

| | | Total Pick-up, Grams |
|---|---|---|
| ↓ "Pliotron" Filter.* | ↓ Filter of above example. | By "Pliotron" Filters... .48 |
| ↓ Filter of above example. | ↓ "Pliotron" Filter.* | By Polyethylene Floss Filters made by above example...... .99 |

SECOND TEST

| | | |
|---|---|---|
| ↓ "Pliotron" Filter.* | ↓ Conventional oiled Glass Fiber Filter. | By "Pliotron" Filters... .81 |
| ↓ Conventional oiled Glass Fiber Filter. | ↓ "Pliotron" Filter.* | By conventional oiled Glass Fiber Filters... .59 |

THIRD TEST

| | | |
|---|---|---|
| ↓ Filter of above example. | ↓ Conventional oiled Glass Fiber Filter. | By Polyethylene Floss Filters made by above example...... 1.82 |
| ↓ Conventional oiled Glass Fiber Filter. | ↓ Filter of above example. | By conventional oiled Glass Fiber Filters... .59 |

*Made according to above-cited Nicol patent.

The higher values for the polyethylene filters in the second and third tests, as compared to the values obtained for the same filters in the first test are attributable to the high air resistance of the oiled glass fiber filters which, it is believed, slowed down the air velocity through the glass filters, resulting in less pick-up of aluminum particles.

The above data show the surprisingly high air filtering effectiveness of polyethylene floss filters made by our invention in comparison to polyethylene filters made by the prior art technique, namely the "Pliotron" filters which represented commercial filters made in accordance with the above-cited Nicol patent.

From the foregoing description, it will be seen that the present invention brings about a considerable advance in the art of gas filtration, enabling the production, in a simple, economical and commercially feasible way, of a polyethylene air filter which is considerably better than the best polyethylene air filters thus far known to the art. It will be seen that the polyethylene filtering material used in our invention is made with a minimum of labor and a minimum capital investment. It will be seen that by enabling the use of the ordinary candy floss machine for the production of the filtering material, great convenience is achieved. These candy floss machines are low in cost so that the capital investment required for a large production of polyethylene floss filters is low. These machines have been known for many years, and have been developed to the point where they are simple and trouble-free to operate. Maintenance costs on these machines are quite low. Many other advantages of our invention will be obvious to those skilled in the art.

Having thus described our invention, what we claim and desire to protect by Letters Patent is:

1. The method of making a gas filter for removing suspended particles of matter from a gas which comprises centrifugally forcing particulate polyethylene against a rotating slotted electrical heating element and thereby effecting melting thereof and ejection in the form of molten filaments outwardly through the slots of said heating element into the surrounding air in a manner generally similar to that by which candy floss is made, said filaments coalescing with one another at occasional points and solidifying upon contact with the air to form a mass of tangled, randomly disposed polyethylene filaments which are irregularly kinked, which vary widely in diameter throughout the mass, and which are fused to contiguous filaments at said points to form an integrated mass, collecting the mass, and filling a foraminous container therewith.

2. The method of making flossed polyethylene which comprises centrifugally forcing particulate polyethylene against a rotating slotted electrical heating element and thereby effecting melting thereof and ejection in the form of molten filaments outwardly through the slots of said heating element into the surrounding air in a manner generally similar to that by which candy floss is made, said filaments coalescing with one another at occasional points and solidifying upon contact with the air to form a mass of tangled, randomly disposed polyethylene filaments which are irregularly kinked, which vary widely in diameter throughout the mass, and which are fused to contiguous filaments at said points to form an integrated mass.

3. A polyethylene floss filter for the removal of dust and dirt from gas comprising a gas pervious mat composed of a mass of tangled, randomly disposed polyethylene filaments which are irregularly kinked, which vary widely in diameter throughout the mass, and which are fused to contiguous filaments at occasional points to form an integrated mass having a density of from 1.5 to 6.0 pounds per cubic foot, the average molecular weight of the polyethylene of which said filter is made not exceeding 15,000, said polyethylene filter characterized by a low back pressure such that the pressure drop of the gas passing through the filter is maintained at a minimum.

References Cited in the file of this patent

UNITED STATES PATENTS

| 2,367,173 | Martin | Jan. 9, 1945 |
| 2,411,660 | Manning | Nov. 26, 1946 |
| 2,433,000 | Manning | Dec. 23, 1947 |
| 2,689,199 | Pesce | Sept. 14, 1954 |